United States Patent [19]

Nishigaki et al.

[11] Patent Number: 5,206,738
[45] Date of Patent: Apr. 27, 1993

[54] MAGNETIC RECORDING APPARATUS HAVING A MEANS FOR DETERMINING RECORDING CURRENT

[75] Inventors: Tetsuo Nishigaki; Takashi Kakuta; Hiroshige Okamoto; Hirokazu Nagasawa, all of Kanagawa, Japan

[73] Assignee: Sony Corporation, Tokyo, Japan

[21] Appl. No.: 774,801

[22] Filed: Oct. 11, 1991

[30] Foreign Application Priority Data

Oct. 19, 1990 [JP] Japan .................................. 2-280783

[51] Int. Cl.⁵ ........................ H04N 9/79; H04N 5/782
[52] U.S. Cl. .................................. 358/315; 358/310; 358/318; 360/31; 360/68; 360/19.1
[58] Field of Search ............... 358/315, 316, 318, 310; 360/31, 19.1, 68

[56] References Cited

U.S. PATENT DOCUMENTS

| 4,713,700 | 12/1987 | Kuwahara et al. | 358/315 |
|---|---|---|---|
| 4,719,520 | 1/1988 | Isshiki | 358/330 |
| 4,764,816 | 8/1988 | Heitmann | 360/31 |
| 5,101,309 | 3/1992 | Mitsuhashi | 360/68 |

FOREIGN PATENT DOCUMENTS 316758 11/1988 European Pat. Off. .

OTHER PUBLICATIONS

European Search Report.
Patent Abstracts of Japan, vol. 14, No. 577, Dec. 21, 1990 (Shiroshita).
Patent Abstracts of Japan, vol. 13, No. 530, Nov. 27, 1989 (Muroi).

Primary Examiner—Tommy P. Chin
Assistant Examiner—Khoi Truong
Attorney, Agent, or Firm—Lewis H. Eslinger; Jay H. Maioli

[57] ABSTRACT

A video tape recorder has a recording current setting unit for setting recording currents to be supplied to a recording head for recording audio and video signals on a magnetic tape. The recording current setting unit controls electronic volume controls to adjust and output audio and video signals to set the recording currents. Level detectors detect reproduced signals, which have been recorded on the magnetic tape by the recording head, and supply the detected signals to the recording current setting unit. The recording current setting unit controls the electronic volume controls to hold the audio signal at a constant level and to simultaneously vary levels of luminance and chrominance signals of the video signal with the levels being kept at a constant ratio, and at the same time controls the recording head to preliminarily magnetically record the audio and video signals on the magnetic tape. Subsequently, the recording current setting unit measures the level of the audio signal based on the reproduced signals from the level detectors and supplies the recording head with a normal recording current based on the levels of the luminance and chrominance signals corresponding to a predetermined value of the measured level of the audio signal.

9 Claims, 9 Drawing Sheets

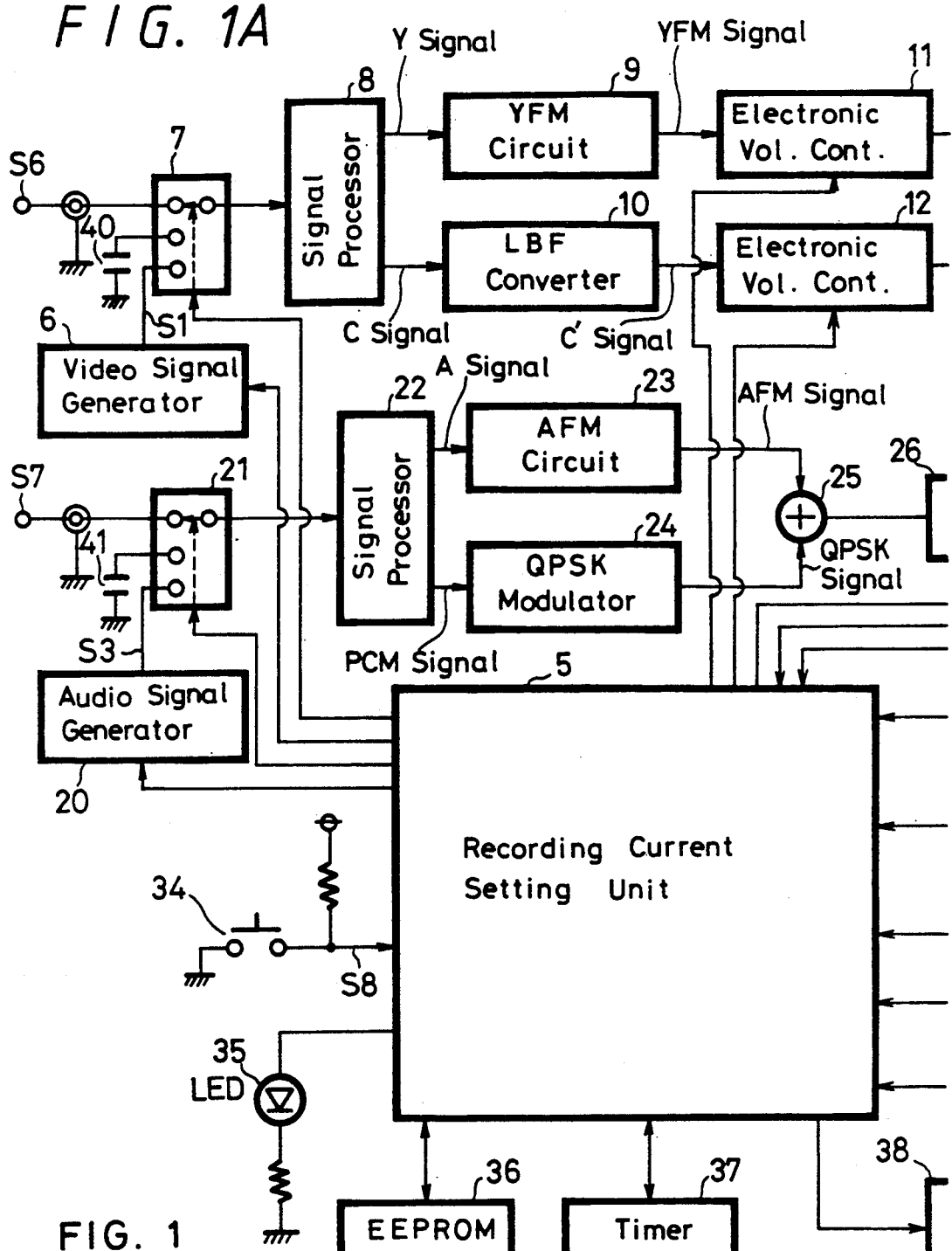

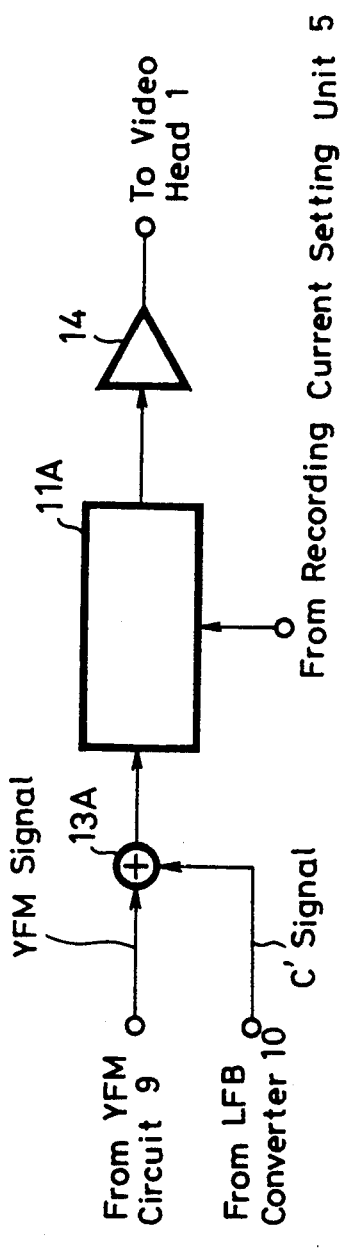
FIG. 2
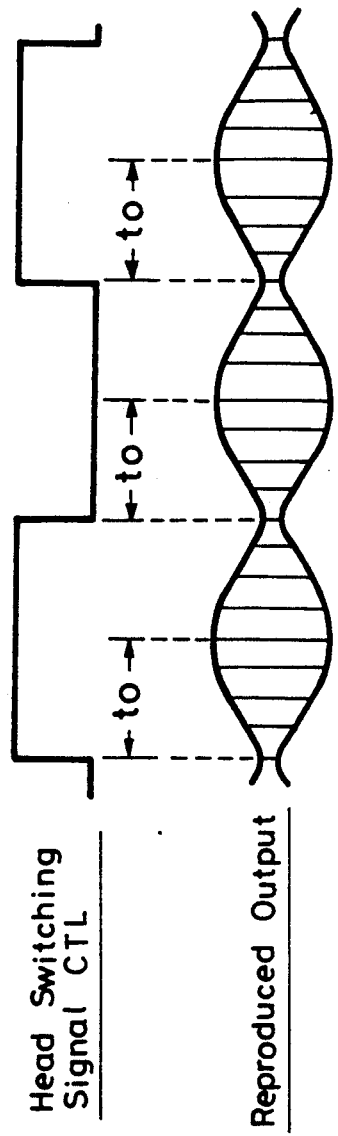
FIG. 3A
FIG. 3B

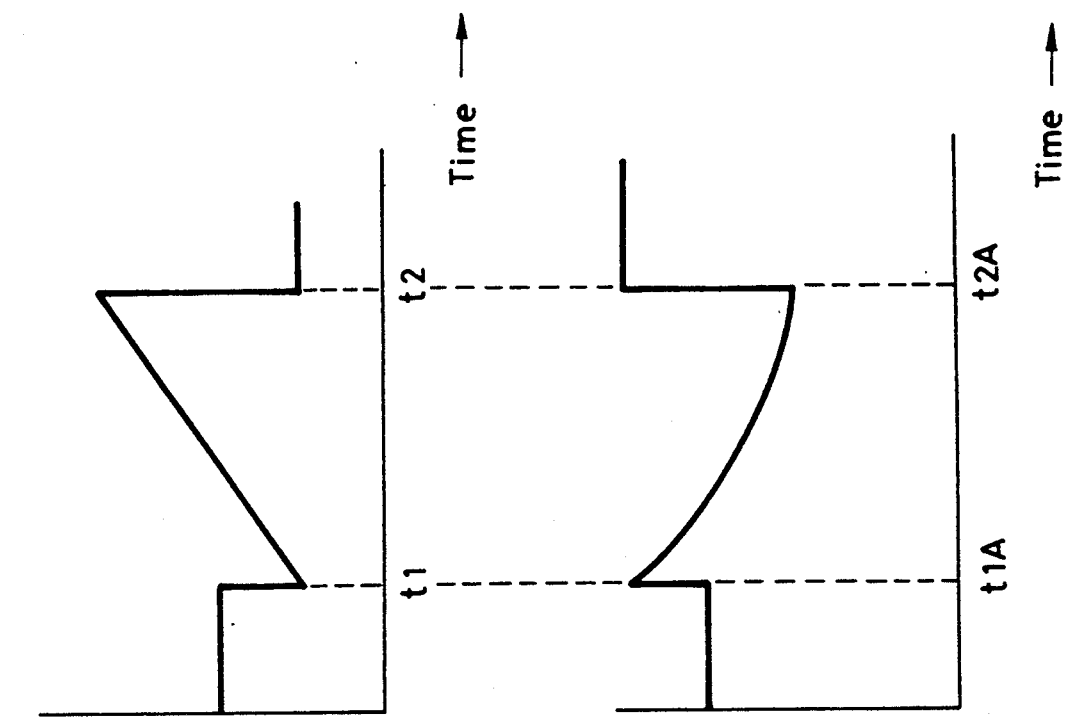
FIG. 4A  Recording
FIG. 4B  Playback

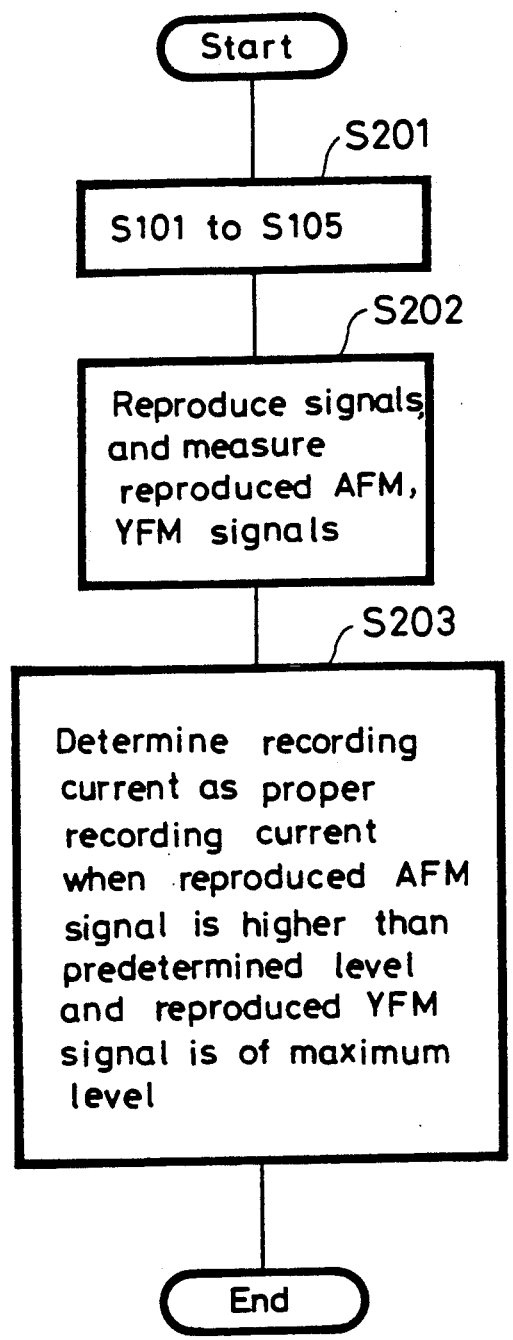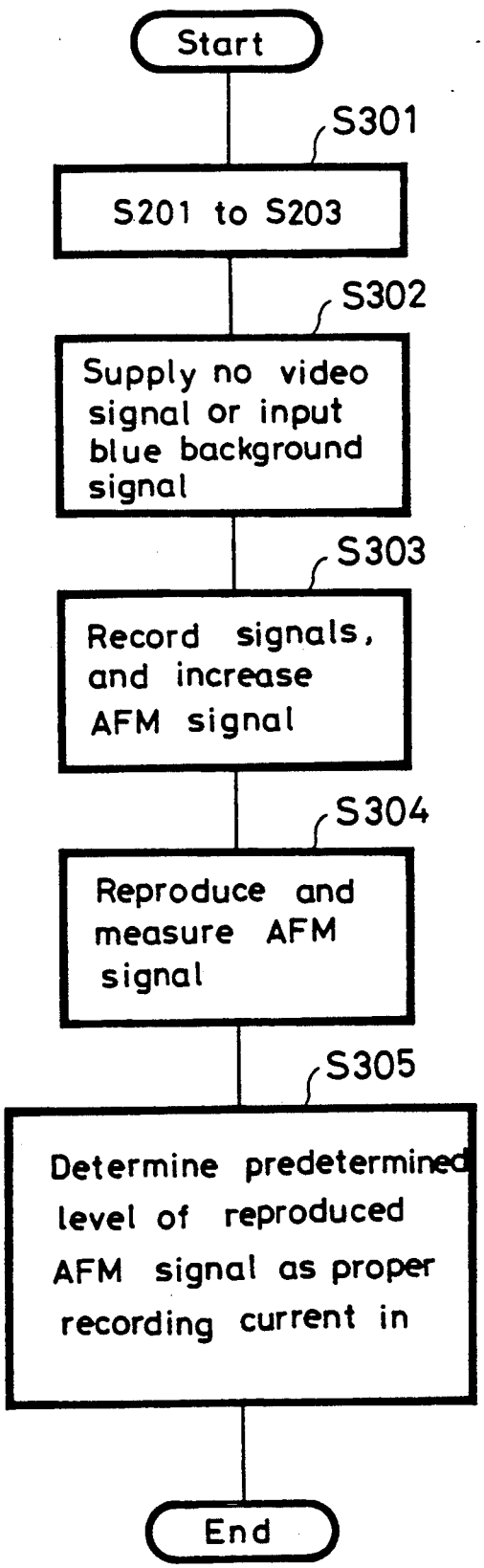
FIG. 10
FIG. 11

MAGNETIC RECORDING APPARATUS HAVING A MEANS FOR DETERMINING RECORDING CURRENT

BACKGROUND OF THE INVENTION

1. Field of the Invention

The present invention relates to a magnetic recording apparatus for use as a video tape recorder, and more particularly to a magnetic recording apparatus having a means for determining a recording current.

2. Description of the Prior Art

Magnetic recording apparatus such as video tape recorders, for example, record and reproduce audio and video signals (hereinafter also referred to as audio/video signals) and are adjusted to a predetermined record/reproduce level in the factory. Recording currents representative of audio/video signals are supplied to magnetic heads by which they are recorded on a magnetic tape, or reproduced currents representative of recorded audio/video signals are supplied from magnetic heads by which they are reproduced from the magnetic tape. Since the audio/video signals, i.e., the recording currents or the reproduced currents are fixed in level, they cannot be adjusted by the user of the magnetic recording apparatus.

When the magnetic heads are worn and their performance varies after a long period of use, since the recording currents are of fixed level, they deviate from optimum recording current values. As a result, the signal-to-noise ratio of a reproduced image tends to be deteriorated, and a reproduced sound tends to be distorted because of the wear of the magnetic heads.

One solution would be to initially set recording currents to values that deviate from the values of optimum recording current in order to make up for eventual wear of magnetic heads. When the magnetic heads have been used and worn after a long period of use, the recording currents would be equalized to the optimum recording currents. However, the recording currents would not be equal to the optimum recording currents when the magnetic heads are initially used, and the recording currents would not remain equal to the optimum recording currents after the optimum recording currents had been reached. Therefore, the initial recording current adjustment would not completely solve the aforesaid problem.

Various different types of magnetic tapes, including an oxide tape, a high-energy oxide tape, a metal-powder tape, a metal-evaporated tape, etc., have different recording characteristics. However, since desired audio/video signals are recorded with a constant-level recording current in the conventional magnetic recording apparatus, the magnetic recording characteristics of the different magnetic tape types are not fully utilized.

OBJECTS AND SUMMARY OF THE INVENTION

In view of the aforesaid drawbacks of the conventional magnetic recording apparatus, it is an object of the present invention to provide a magnetic recording apparatus having means for adjusting recording currents to record audio/video signals irrespective of different magnetic recording characteristics of a variety of types of magnetic tapes and also of varied magnetic recording characteristics due to wear of recording heads.

According to the present invention, there is provided a magnetic recording apparatus comprising a recording head for magnetically recording signals on a magnetic tape, recording current setting means for setting recording currents to be supplied to the recording head, and recording signal adjusting means, controllable by the recording current setting means, for adjusting and outputting audio and video signals to set the recording currents, reproduced signal detecting means for detecting reproduced signals, which have been recorded on the magnetic tape by the recording head, and supplying the detected signals to the recording current setting means, the recording current setting means comprising means for controlling the recording signal adjusting means to hold the audio signal at a constant level and to simultaneously vary levels of luminance and chrominance signals of the video signal with the levels being kept at a constant ratio, while controlling the recording head to preliminarily magnetically record the audio and video signals on the magnetic tape, and for subsequently measuring the level of the audio signal based on the reproduced signals from the reproduced signal detecting means and supplying the recording head with normal recording currents based on the levels of the luminance and chrominance signals corresponding to a predetermined value of the measured level of the audio signal.

The magnetic recording apparatus keeps any waveform distortions of the reproduced audio signal below a certain value, and also maintains the signal-to-noise ratio of the reproduced video signal above a certain value. When the audio and video signals are magnetically recorded on the magnetic tape, they are recorded with the normal recording currents. Therefore, the audio and video signals are automatically recorded on the magnetic tape with proper recording currents irrespective of different magnetic characteristics of a wide variety of types of magnetic tapes, different magnetic characteristics of different magnetic tapes of one type, and different magnetic recording characteristics of the recording head due to wear.

According to the present invention, there is also provided a magnetic recording apparatus comprising a recording head for magnetically recording signals on a magnetic tape, recording current setting means for setting recording currents to be supplied to the recording head, recording signal adjusting means, controllable by the recording current setting means, for adjusting and outputting audio and video signals to set the recording currents, and reproduced signal detecting means for detecting reproduced signals, which have been recorded on the magnetic tape by the recording head, and supplying the detected signals to the recording current setting means, the recording current setting means comprising means for controlling the recording signal adjusting means to hold the audio signal at a constant level and to simultaneously vary levels of luminance and chrominance signals of the video signal with the levels being kept at a constant ratio, while controlling the recording head to preliminarily magnetically record the audio and video signals on the magnetic tape, and for subsequently measuring the level of the audio signal and the level of the luminance signal based on the reproduced signals from the reproduced signal detecting means and supplying the recording head with normal recording currents based on the level of the luminance signal and the level of the chrominance signal corresponding to the level of the luminance signal when the measured level of the audio signal is higher than a predetermined value and the measured level of the luminance signal is of a substantially maximum value.

The above magnetic recording apparatus allows the audio and video signals to be recorded on the magnetic tape with more proper or optimum recording currents irrespective of different magnetic characteristics of a wide variety of types of magnetic tapes, different magnetic characteristics of different magnetic tapes of one type, and different magnetic recording characteristics of the recording head due to wear.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIG. 2 is a block diagram of a simplified circuit for adding output signals from a YFM circuit and a low-frequency-band converter in the magnetic recording apparatus shown in FIG. 1B;

FIGS. 3A and 3B are diagrams showing the waveforms of signals that are observed when a video tape is played back while it is being fed in a reverse direction;

FIGS. 4A and 4B are diagrams showing the manner in which a time marker is produced;

FIGS. 10, 11, and 12 are flowcharts of other processing sequences for determining proper recording currents.

DETAILED DESCRIPTION OF THE PREFERRED EMBODIMENT

Figure 1B:
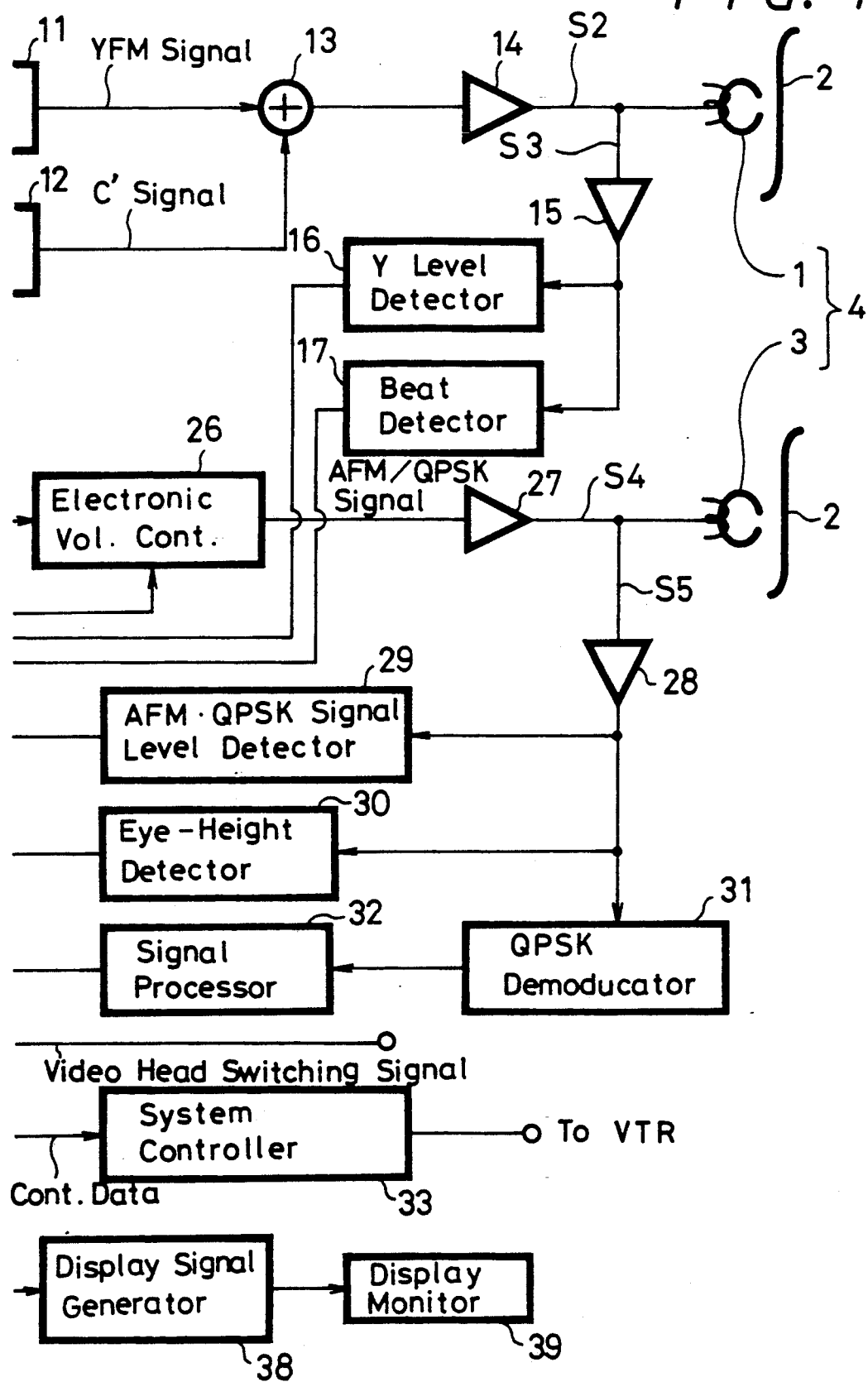
FIG. 1, made up of FIGS. 1A and 1B, is a block diagram of a magnetic recording apparatus according to the present invention.

FIG. 1 shows in block form a magnetic recording apparatus according to the present invention, the magnetic recording apparatus being in the form of a video tape recorder.

As shown in FIG. 1, the magnetic recording apparatus has a video head 1 and an audio head 3. The video head 1 includes magnetic heads for channels CH1, CH2, and magnetically records a video signal on a magnetic video tape 2. The audio head 3 includes magnetic heads for the channels CH1, CH2 and magnetically records a Hi-Fi stereophonic audio signal or an audio PCM signal on the video tape 2. The Hi-Fi stereophonic audio signal will also be referred to as an analog audio signal or A signal, and the audio PCM signal will also be referred to as a PCM signal. The Hi-Fi stereophonic audio signal and the audio PCM signal will also be referred to collectively as an audio signal. For the sake of brevity, the video head 1 and the audio head 3 will also be referred to collectively as a recording head 4.

The magnetic recording apparatus also includes a recording current setting unit 5 for setting recording currents to be supplied to the recording head 4. The recording current setting unit 5 comprises a one-chip microprocessor, for example, that includes a CPU, a ROM, a RAM, and I/O circuits, e.g., an A/D converter and a D/A converter.

The recording current setting unit 5 controls the levels of chrominance and luminance signals in a video signal generator 6. A video signal S1 produced by the video signal generator 6 is supplied through a selector 7, a signal processor 8 for the chrominance (C) and luminance (Y) signals, a YFM circuit 9, a low-frequency-band converter 10, electronic volume controls 11, 12, and an adder 13 to a recording amplifier 14. The recording amplifier 14 converts the supplied video signal S1 into a recording current signal S2, which is supplied to the video head 1. The recording current signal S2 is magnetically recorded on the video tape 2 by the video head 1. Each of the electronic volume controls 11, 12 serves as a recording signal adjusting means.

The video signal that has been magnetically recorded on the video tape 2 is reproduced as a reproduced signal S3 by the video head 1. The reproduced video signal S3 is supplied through a reproducing amplifier 15 to a Y level detector 16 and a beat detector 17. The Y level detector 16, which may comprise an envelope detector or the like, detects the level of the Y signal produced by the signal processor 8 and contained in the reproduced signal S3, and the beat detector 17 detects the level of a signal having a frequency of $fy \pm 2fc$ in the reproduced signal S3. The detected levels are then read by the recording current setting unit 5.

The recording current setting unit 5 also controls the level of an A signal and the bit pattern of a PCM signal in an audio signal generator 20. An audio signal S3 produced by the audio signal generator 20 is supplied through a selector 21, a signal processor 22 for the A and PCM signals, an AFM circuit 23, a QPSK modulator 24, an adder 25, and an electronic volume control (recording signal adjusting means) 26 to a recording amplifier 27. The recording amplifier 27 converts the audio signal into a recording current signal S4, which is supplied to the audio head 3. The recording current signal S4 is magnetically recorded on the video tape 2 by the audio head 3.

The audio signal that has been magnetically recorded on the video tape 2 is reproduced as a reproduced signal S5 by the audio head 3. The reproduced audio signal S5 is supplied through a reproducing amplifier 28 to an AFM/QPSK level detector 29 and an eye-height detector 30. The AFM/QPSK level detector 29 detects the levels of AFM and QPSK signals produced respectively by the AFM circuit 23 and the QPSK modulator 24 and contained in the reproduced signal S5. The eye-height detector 30 detects the eye height of an eye pattern in the reproduced signal S5. The reproduced signal S5 is also supplied to a QPSK demodulator 31 and a signal processor 32, which detect the bit error rate of the PCM signal in the reproduced signal S5. The detected bit error rate is read by the recording current setting unit 5.

The selector 7 selectively supplies a video signal S6, which is to be recorded, from a tuner or a line signal source (not shown), a non-signal state from a grounded capacitor 40, or the video signal S1 to the signal processor 8 under the control of the recording current setting unit 5. Similarly, the selector 21 selectively supplies an audio signal S7, which is to be recorded, from a tuner or a line signal source (not shown), a non-signal state from a grounded capacitor 41, or the audio signal S3 to the signal processor 22 under the control of the recording current setting unit 5.

The recording current setting unit 5 is connected to a system controller 33 so that control data will be transmitted between the recording current setting unit 5 and the system controller 33. The system controller 33 serves to control all functions of the video tape recorder, such as servo control of the recording head 4, when the video tape recorder records and reproduces audio and video signals. The recording current setting unit 5 is supplied with a video head switching signal CTL for switching between the magnetic heads for the channels CH1, CH2.

To the recording current setting unit 5, there is connected a reset switch 34 that is closed when a proper (optimum) recording current is to be detected under present conditions, i.e., when a preliminary recording process is carried out. The proper recording current will hereinafter referred to as a proper recording current INB with respect to a proper recording current signal S2 in the video signal recording process, and as a proper recording current INA with respect to a proper recording current signal S4 in the audio signal recording process. The proper recording currents INB, INA will also be referred to collectively as a proper recording current IN. An LED 35 connected to the recording current setting unit 5 serves as an indicator that blinks while the proper recording current is being set and is continuously energized after the proper recording current has been set. Then, the LED 35 is de-energized after elapse of a certain period of time.

A memory 36, which is an electrically alterable nonvolatile memory such as an EEPROM, is also connected to the recording current setting unit 5. The memory 36 stores the determined proper recording current IN, and also values (data) that are established by the electronic volume controls 11, 12, 26 in order to generate proper recording current signals S2, S4 corresponding to the proper recording current IN. The data to be stored in the memory 36 represent, for example, established values indicating the type of the video tape used and the speed at which signals are to be recorded on the video tape. A timer 37 connected to the recording current setting unit 5 serves to measure time when the proper recording current IN is to be detected. To the recording current setting unit 5 and the system controller 33, there is also connected a display signal generator 38 such as an on-screen display IC or the like for generating certain characters to be displayed on the screen of a display monitor 39.

The video tape recorder incorporating the magnetic recording apparatus according to the present invention is of the basic structure as described above. Now, operation of the video tape recorder will hereinafter be described.

First, a normal recording process rather than the preliminary recording process in which the proper recording current IN is determined and set will be described below. The recording current setting unit 5 controls the selector 7 to select the video signal S6 from the tuner or the line signal source. The selected video signal S6 is separated into the Y (luminance) signal and the C (chrominance) signal by the signal processor 8. The Y signal is modulated into a YFM signal by the YFM circuit 9, and the C signal is converted into a C'(low-frequency-band-converted chrominance) signal by the low-frequency-band converter 10. Then, the YFM and C' signals are supplied to the adder 13 through the electronic volume controls 11, 12 that are adjusted by the recording current setting unit 5 such that the supplied signals are equalized to a previously detected proper recording current INB stored in the memory 36 or another current. The YFM and C' signals are added by the adder 13, and the sum signal is magnetically recorded on the video tape 2 through the recording amplifier 14 and the video head 1.

In synchronism with the above video signal recording operation, the recording current setting unit 5 controls the selector 21 to select the audio signal S7 from the tuner or the line signal source. The selected audio signal S7 is then applied to the signal processor 22 by which the A signal or the PCM signal is separated from the audio signal S7. If the A signal is separated, then it is frequency-modulated into the AFM signal by the AFM circuit 23, and the AFM signal is supplied though the adder 25 to the electronic volume control 26. If the PCM signal is separated, then it is modulated into the QPSK signal by the QPSK modulator 24, and the QPSK signal is supplied through the adder 25 to the electronic volume control 26. The electronic volume control 26 has been adjusted by the recording current setting unit 5 such that the supplied signal is equalized to a previously detected proper recording current INA stored in the memory 36 or another current. The AFM signal or the QPSK signal that has thus been adjusted to a suitable level by the electronic volume control 26 is magnetically recorded on the video tape 2 through the recording amplifier 27 and the audio head 3.

The preliminary recording process for determining and setting the proper recording current IN will now be described below. For the sake of brevity and a better understanding, the preliminary recording process is divided into a plurality of sections that will successively be described.

Start of the Preliminary Recording Process

When the user of the video tape recorder presses the reset switch 34, a low-level reset signal S8 is detected by the recording current setting unit 5, which then starts determining the proper recording current IN. Instead of pressing the reset switch 34, the preliminary recording process may be started by supplying a signal equivalent to the reset signal S8 from the system controller 33 to the recording current setting unit 5 a certain period of time before a timer-programmed recording mode is carried out. Alternatively, the preliminary recording process may be started at a certain time everyday using the timer 37 when the video tape recorder is not in operation, or a menu for setting the proper recording current may be displayed on the display monitor 39 and the preliminary recording process may be started on the basis of the displayed menu only when the menu is selected by the user. The reset switch 34 may be mounted on the video tape recorder itself, or may be mounted on a remote control unit (not shown) for the video tape recorder.

Display on the Display Monitor 39 in the Preliminary Recording Process

After detecting the reset signal S8, the recording current setting unit 5 blinks the LED 35. In addition, the recording current setting unit 5 controls the display signal generator 38 to display a message such as "PROPER (OPTIMUM) RECORDING CURRENT IS BEING DETERMINED AND SET" on the display monitor 39. Alternatively, the message may be displayed on a flat display tube or a liquid crystal display unit (not shown) on the video tape recorder.

Selection by the Selectors 7, 21 While the Proper Recording Current IN is being Determined First, the recording current setting unit 5 controls the selectors 7, 21 to select the non-signal state. Therefore, the input terminals of the signal processors 8, 22 are connected to ground through the capacitors 40, 41. As a result, the YFM signal produced by the YFM circuit 9 is of a single frequency, and no C' signal is produced by the low-frequency-band converter 10. When the YFM signal is recorded on the video tape 2 and thereafter reproduced, any variations in the video output level due to frequency changes are eliminated. Furthermore, since there is no C' signal, a filter for removing the C'signal is not required at the input terminal of the Y level detector 16. Since the AFM signal produced by the AFM circuit 23 that is supplied with the A signal is also of a single frequency, any variations in the audio output level due to frequency changes are eliminated when the AFM signal is recorded on the video tape 2 and thereafter reproduced.

Then, the recording current setting unit 5 controls the selector 7 to select the video signal S1 from the video signal generator 6. The recording current setting unit 5 then varies the levels of the Y and C signals of the video signal S1 and the colors represented by the C signal, so that signals of a wide variety of frequencies can be recorded on the video tape 2 in a time-division multiplexing fashion using the timer 37. When the video tape 2 is played back, different frequency-dependent video output levels, i.e., frequency characteristics, can be obtained. The on-screen display IC of the display signal generator 38 may double as the video signal generator 6.

Likewise, the recording current setting unit 5 controls the selector 21 to select the audio signal S3 from the audio signal generator 20. The recording current setting unit 5 then varies the level, the frequency, and the bit pattern of the audio signal S3, so that signals of a wide variety of frequencies can be recorded on the video tape 2 in a time-division multiplexing fashion using the timer 37. When the video tape 2 is played back, different frequency-dependent audio output levels, i.e., frequency characteristics, can be obtained. The recording current setting unit 5 may be programmed by software to generate an audio signal, so that the recording current setting unit 5 may double as the audio signal generator 20.

The variety of frequency characteristics may not be taken into account, and yet the proper recording current IN may be determined by directly recording the video signal S6 and the audio signal S7 from the tuner or the line signal source on the video tape 2.

Recording of the Recording Current Signals S2, S4 in the Preliminary Recording Mode The recording of the recording current signals S2, S4 will briefly be described below, and will be described in detail later on with respect to the algorithm for determining the proper (optimum) recording current.

First, the recording current setting unit 5 gives an audio/video recording command to the system controller 33 to put the video tape recorder in an audio/video recording mode. The audio/video signals are recorded on the video tape 2 while the levels of the audio/video signals are being adjusted to vary the recording current signals S2, S4 by the electronic volume controls 11, 12, 26. For example, the recording current signal S4 depending on the audio signal is set to a predetermined current value, and that current value is recorded on the video tape 2 through the audio head 3. At the same time, while the ratio of the level of the Y signal to the level of the C signal is being maintained at a constant value, edges of the video head switching signal CTL are counted. Each time the count reaches a predetermined value, i.e., at each predetermined interval of time, the Y signal (or the YFM signal) and the C signal (or the C' signal) are simultaneously varied stepwise from a relatively small current value to a large current value, and recorded on the video tape 2. Rather than relying on the edge count of the video head switching signal CTL, a predetermined period of time may be counted by the timer 37 or the time that has elapsed may be measured by a software loop (the loop time is constant) of the recording current setting unit 5 for varying the current values of the Y signal (or the YFM signal) and the C signal (or the C' signal). The recording current signals S2, S4 may not be varied by operating the electronic volume controls 11, 12 to vary the YFM and C' signals and also operating the electronic volume control 26 to vary the AFM signal or the QPSK signal, but may be varied by controlling the video signal generator 6 to vary the video signal S1 thus varying the Y and C signals and also controlling the audio signal generator 20 to vary the level of the audio signal S3 thus varying the A signal or the PCM signal. It will be understood in the description which follows that when the Y signal is varied, the YFM signal may be varied, and when the C signal is varied, the C' signal may be varied. When the Y and C signals are varied only while maintaining the level ratio between these signals at a constant value, the YFM signal and the C' signal may be added to each other by an adder 13A (see FIG. 2), and the sum signal may be varied by an electronic volume control 11A. Such a circuit shown in FIG. 2 is simple in arrangement.

Playback in the Preliminary Recording Process

The playback mode of the video tape recorder in the preliminary recording process will briefly described below, and will be described in detail later on with respect to the algorithm for determining the proper (optimum) recording current. After the recording current signals are recorded, as described above, the recording current setting unit 5 controls the system controller 33 to rewind the video tape 2 back to a recording start point where the signals started being recorded. After the video tape 2 is rewound, the recording current setting unit 5 issues a playback command to put the video tape recorder in a playback mode.

In the playback mode, the recording current setting unit 5 reads the data indicative of the level of the Y signal, the level of the signal whose frequency is $f_y \pm 2f_c$, and the level of the AFM signal or the QPSK signal from the Y level detector 16, the beat detector 17, and the level detector 29. The recording current setting unit 5 also reads counter data from the system controller 33, so that the level data may be read as corresponding to the recording current signals in relation to the counter data. By sampling the data in synchronism with the head switching signal CTL in timed relation to a high or low level of the head switching signal CTL, the recording current setting unit 5 can read the data as being identified with respect to the channels CH1, CH2 of the video head 1 and the audio head 3. With the data thus read as being identified with respect to the channels CH1, CH2, the recording current setting unit 5 can set the proper recording current IN that corresponds to the data of a channel head whose level is lower in the output characteristics. When the proper recording current IN is set as corresponding to the low-level channel head, maximum recording currents can be selected which can increase the signal-to-noise ratio of the video signal, and reduce any distortion of the audio signal. Depending on the use of the video tape recorder or the preference of the user, if the output characteristics differ from each other, the proper recording current IN may be determined on the basis of an average value. One of these different processes of determining the proper recording current IN may be selected from a menu or preset by a default value.

By sampling the output data twice or more in the period of a certain level of the head switching signal CTL, e.g., a high-level period, it can be determined whether the recording head 4 is held in good contact with the video tape 2. Therefore, the proper recording current IN may be determined using the higher-level output data of the two sampled output data as effective data.

When the level of the output data is lower than a predetermined value, the display monitor 39 may display a message to the extent that the proper recording current IN cannot be determined, because the video tape 2 may suffer dropouts or other defects due to deterioration of its quality.

The level of the AFM signal may be detected simultaneously or separately for L and R channels. If the level of the AFM signal is detected separately for the L and R channels, then it is often preferable to set the proper recording current for the AFM signal using the lower level of the AFM signal in the L or R channel as a reference level.

The time from a playback start point where the recorded signals start being reproduced to a normal playback process can be shortened if the video tape recorder has an automatic tracking function. More specifically, the recording current setting unit 5 gives a command to the system controller 33 for forcibly turning off the automatic tracking function. In the preliminary recording process for setting the proper recording current IN, the recording current setting unit 5 records the video/audio signals in a self-recording mode, and can reproduce the recorded signals normally even if the automatic tracking function is turned off.

When the level of the reproduced signal is to be detected, the video tape 2 is first rewound to the recording start point where the signals started being recorded, and is then played back. However, the level of the reproduced signal may be measured while the video tape 2 is being played back in the reverse direction to the recording start point (so-called "$-\times 1$ playback mode"). In this case, the reproduced output signal has a substantially rhombic shape as shown in FIG. 3B. Therefore, it is necessary to sample the level exactly a constant period of time after positive- and negative-going edges of the head switching signal CTL (see FIG. 3A). Specifically, when a positive- or negative- going edge of the head switching signal CTL is detected by the recording current setting unit 5, it is necessary to sample the level a constant period of time (e.g., t0 as shown) after the detection of the positive- or negative- going edge, using the timer 37 or a software loop.

Alternatively, the level of the reproduced signal may be measured while the video tape 2 is being played back in a still mode, rather than the $-\times 1$ playback mode.

If the counter data of the video tape recorder cannot be inputted into the recording current setting unit 5 from the system controller 33, then, as shown in FIG. 4A, the recording current for the Y signal may be varied not only from a lower level (at a time t1) to a higher level (at a time t2), but also further to a lower level immediately after it has been varied from the lower level to the higher level. In this manner, as shown in FIG. 4B, when the reproduced signal is to be measured, the AFM signal goes from a higher level (at a time t1A) gradually to a lower level and then abruptly back to the higher level (at a time t2A). By employing the time t2A as a marker, it is possible to know the YFM and C' signals accurately that correspond to the recording current signal S2 even if no counter data are available. Insofar as a marker output signal can be obtained, the level of the recording current signal S2 may be varied in various other ways rather than the method shown in FIGS. 4A and 4B.

Display on the Display Monitor 39 in the Preliminary Recording Process

Figure 5:
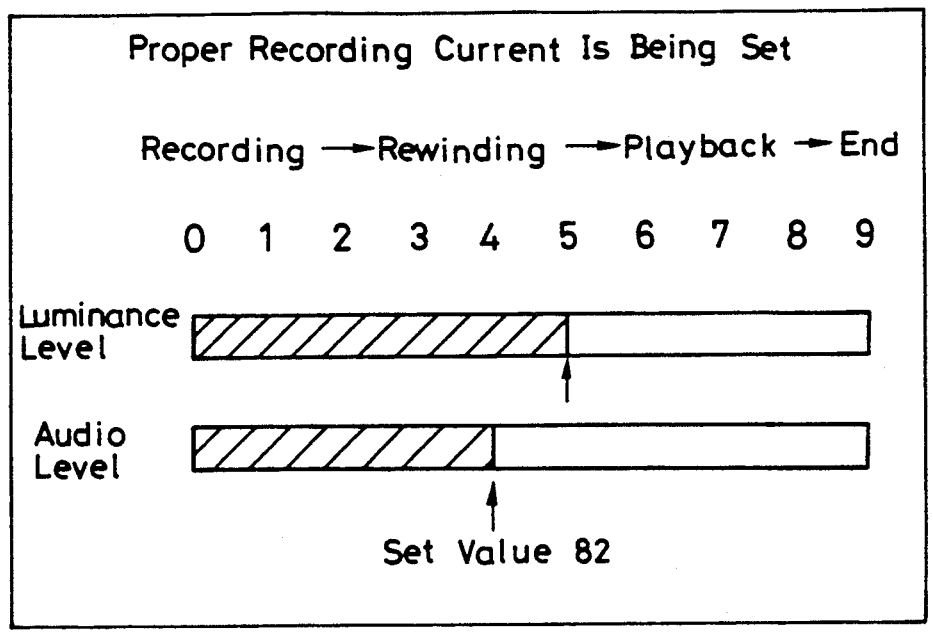
FIGS. 5 and 6 are diagrams of images displayed on a display monitor when proper recording currents are to be determined.

The display on the display monitor 39 in the preliminary recording process will be described below in greater detail. As shown in FIG. 5, while the proper recording current IN is being detected and set, the display monitor 39 displays a message such as "PROPER RECORDING CURRENT IS BEING SET" or "OPTIMUM RECORDING CURRENT IS BEING SET" in an uppermost area thereof. The display monitor 39 also displays modes of operation of the video tape recorder, such as "RECORDING→REWINDING→PLAYBACK→END," in a lower area below the uppermost area. The present mode of operation is indicated by a different color or an underline that can move from mode to mode. The display monitor 39 displays in its central area the levels of the YFM and AFM signals that are measured while they are being reproduced, the levels being indicated by bar graphs (bar lengths). The display monitor 39 further displays in its lowermost area a value ("82" in this case) that has been set.

Figure 6:
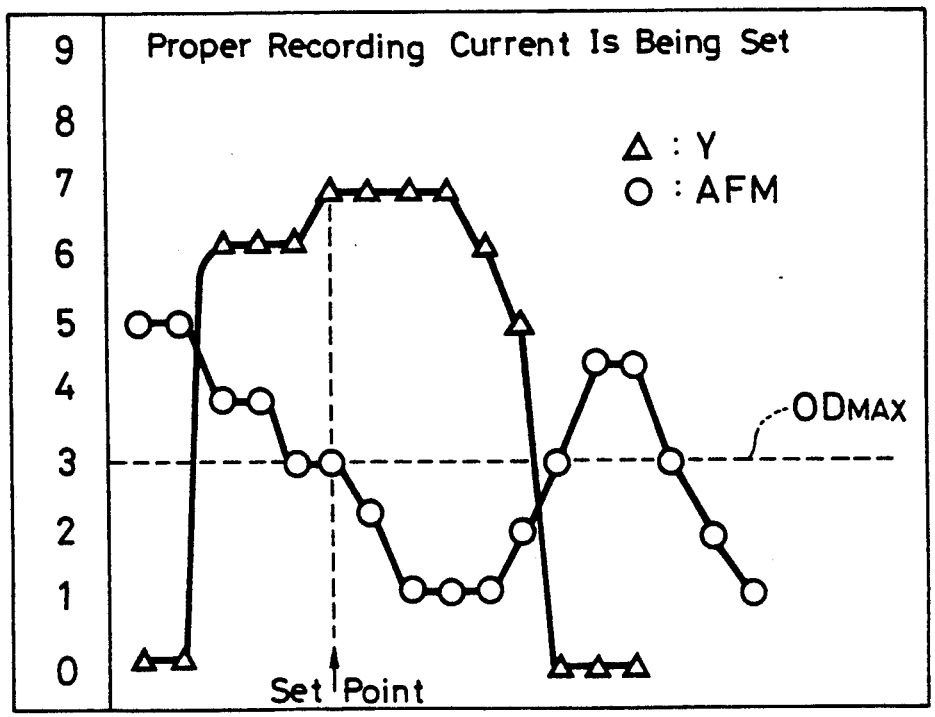

FIG. 6 shows another display example with the horizontal axis representing the recording current and the vertical axis representing the output level of the reproduced signal. In FIG. 6, the curve indicated by a succession of circles represents the output level of the AFM signal, and the curve indicated by a succession of triangles represents the output level of the Y signal. " ↑ set point" represents a point that has been set. The set point in FIG. 6 indicates a level represented by a dotted line where the waveform distortion of the reproduced AFM signal is relatively large, i.e., a gurgling noise level ODMAX. The gurgling noise is produced when the reproduced YFM or C! signal is mixed into the reproduced AFM signal. Generally, the gurgling noise is of such characteristics that it is gradually generated when the reproduced AFM signal is relatively low level and is abruptly generated with increased probability when the reproduced AFM signal becomes lower than a certain level. The specific value of the gurgling noise level ODMAX may be determined taking a practical level into account, depending on the application or the like of the video tape recorder.

While the proper recording current IN is being determined and set, the above items of information are displayed on the display monitor 39 to let the user know the present processing operation clearly. In combination with the image display, the information may also be given to the user by way of synthesized speech.

Algorithm for Determining the Proper (Optimum) Recording Current

The algorithm for determining the proper (optimum) recording current will be described below with reference to the flowchart of FIG. 7 that schematically represents a program stored in the ROM of the recording current setting unit 5.

First, the recording current setting unit 5 reads a low-level reset signal S8 from the reset switch 34 in order to start a process of determining the proper recording current IN in a step S101. The recording current setting unit 5 may alternatively read a quasi-reset signal produced by the timer 37 or the like, as described above.

Then, the recording current setting unit 5 sends switching signals to the selectors 7, 21 to connect the video signal generator 6 to the signal processor 8 and also connect the audio signal generator 20 to the signal processor 22 in a step S102. At this time, the audio signal generator 20 produces only the A signal, so that only the A signal is supplied to the signal processor 22.

The recording current setting unit 5 controls the electronic volume control 26 to keep the AFM signal at a constant level in a step S103 for the purpose of maintaining the audio recording current signal S4 at a constant level.

Thereafter, the recording current setting unit 5 sets the YFM and C' signals to relatively low levels, respectively, and keeps the ratio between the levels of the YFM and C' signals at a constant level in a step S104 so that the video recording current signal S2 is recorded with the YFM and C' signals at a constant ratio.

Now, the recording current setting unit 5 controls the system controller 33 to rewind the video tape 2, and magnetically records the recording current signals S2, S4 thus set on the video tape 2 with the video head 1 and the audio head 3 in the REC mode. At this time, the YFM and C' signals are increased in level at predetermined intervals of time, with the level ratio remaining constant, while they are being recorded, in a step S105. The video tape 2 may be rewound after the step S101, or the steps S102 through S104 may be executed while the video tape 2 is being rewound.

After the audio/video signals have been recorded in the step S105, the video tape 2 is played back in the PB mode. The level of the reproduced AFM signal, e.g., the AFM signal of the L channel (LCH) whose frequency is 1.3 MHz, is read from the level detector 29 and measured in a step S106.

Figure 8:
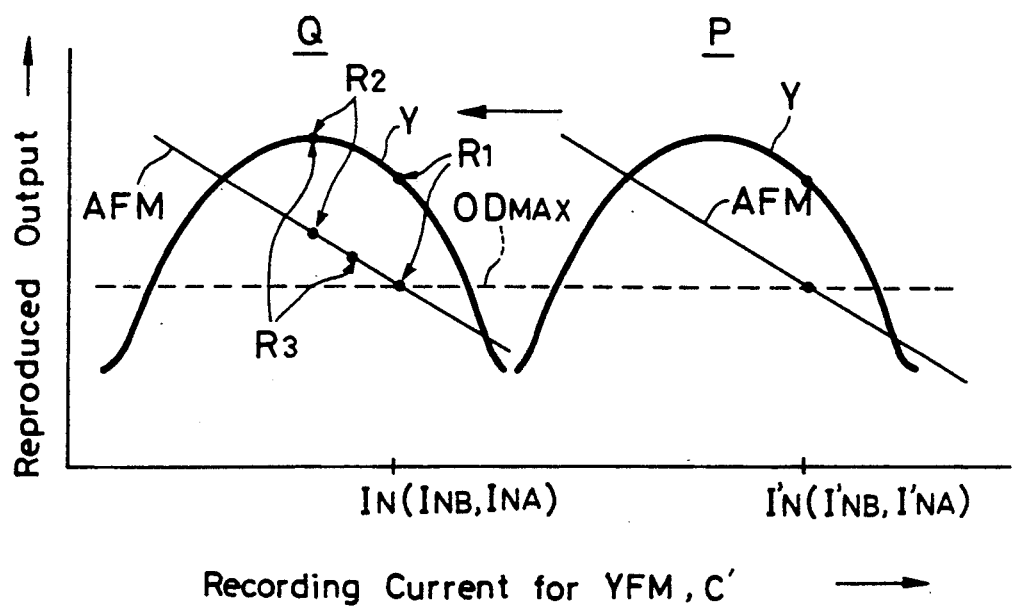
FIG. 8 is a diagram showing the relationship between recording currents and a reproduced output signal.

When the reproduced AFM signal reaches a certain level, e.g., the gurgling noise level ODMAX, the levels of the YFM and C' signals are determined as the proper recording current IN (the proper recording current INB for recording the video signal and the proper recording current INA for recording the audio signal, indicated by points R1 in FIG. 8), and stored in the memory 36 in a step S107. The set values for the electronic volume controls 11, 12, 26 at this time are also stored in the memory 36. The levels of the YFM and C' signals are determined as the proper recording current IN as described above because of the relationship between the recording current signal S2 (the YFM and C' signals) and the reproduced output signal as shown in FIG. 8. More specifically, the AFM signal is indicated by a characteristic curve with a negative gradient, and the Y signal is indicated by an upwardly convex characteristic curve. It is known that as the recording head 4 wears, i.e., as the recording head 4 is used for a longer period of time, these characteristic curves are shifted from the one indicated by P to the one indicated by Q in FIG. 8.

Figure 7:
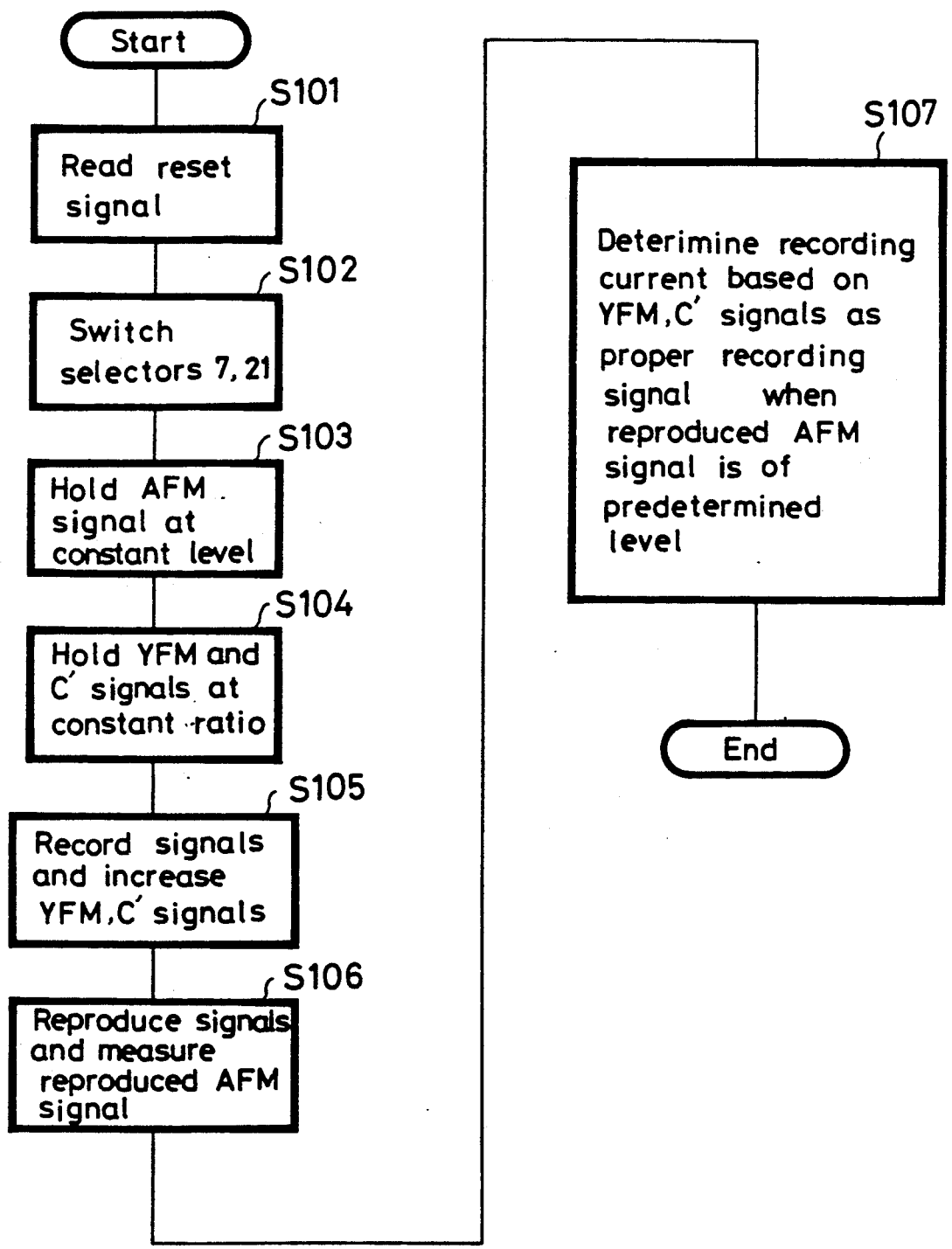
FIG. 7 is a flowchart of a processing sequence for determining proper recording currents.
Figure 9:
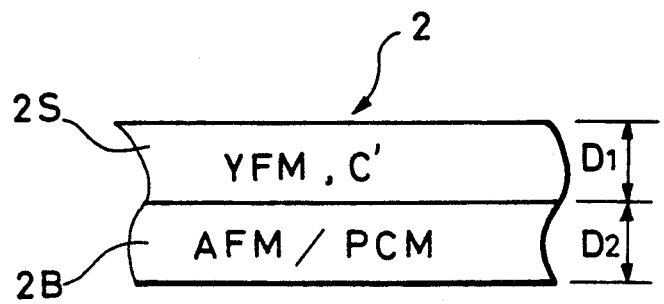
FIG. 9 is a schematic view showing the manner in which signals are recorded in the multi-layer recording mode.

According to the process of determining the proper recording current IN as shown in FIG. 7, the proper recording current IN that matches the type of the video tape 2 and the tape speed thereof can automatically be determined depending on the tape type and the tape speed. Therefore, the signal-to-noise ratio can be maintained at a constant level or higher without suffering the gurgling noise in the reproduced audio signal. More specifically, as shown in FIG. 9, the AFM and PCM signals of the audio signal are first recorded in a back layer 2B of the video tape 2 remote from the recording head 4, and then the YFM and C' signals of the video signal are recorded in a surface layer 2S of the video tape 2 held in contact with the recording head 4. In order to avoid the gurgling noise, it is necessary to maintain a constant recording depth D2 for the AFM signal of a constant level; (If the recording current for the video signal is increased, then the recording depth D1 of the surface layer 2S is increased, and the recording depth D2 of the back layer 2B is reduced).

According to the process shown in FIG. 7, the signal-to-noise ratio of the video signal is kept at a constant level or higher, and a reverse phenomenon can be prevented from taking place. More specifically, if the video signal was recorded with an original proper recording current I'N (higher than the proper recording current IN) in the video tape recorder with the characteristic curve shifted from P to Q, then higher frequencies (white side) of the YFM signal would be greatly attenuated. These frequencies are recorded in a surface region (on the upper side in FIG. 9) of the surface layer 2S of the video tape 2, and might not be recorded in worst cases.

In the step S106 shown in FIG. 7, when the reproduced AFM signal has not reached a predetermined level (the gurgling noise level ODMAX in the embodiment), the fact that the reproduced AFM signal has not reached the predetermined level may be displayed on the display monitor 39, and also a message indicating a next action for the user to take, e.g., closing the reset switch to set the recording current again or replacing the video tape, may be displayed on the display monitor 39.

The memory capacity required to record the determined proper recording current IN in the memory 36 is 16 bytes. Of these 16 bytes, four groups of 4 bytes (1 byte for the proper current and 3 bytes for the set values of the respective electronic volume controls 11, 12, 26) are assigned to the following recording modes, respectively, for the storage of the proper recording current IN:

| | |
|---|---|
| (1) VHS normal tape | Standard recording (SP) mode |
| (2) VHS normal tape | Extended recording (EP) mode |
| (3) SVHS tape | SP mode |
| (4) SVHS tape | EP mode |

In the step 106, the video tape 2 is played back first in the EP mode and then in the SP mode because the characteristics of the motor driving a capstan dictates such a playback sequence for stabilizing reproduced images in a short period of time, resulting in a reduction in the time needed to determine the proper recording current IN.

FIG. 10 shows another processing sequence for the algorithm of determining the proper recording current. A step 201 shown in FIG. 10 effects the same operation as the steps S101 through S105 shown in FIG. 7. In the step S105, the YFM and C' signals are increased in level at predetermined intervals of time, with the level ratio remaining constant.

In a step S202, the recording current setting unit 5 reads and measures the level of the reproduced AFM signal (e.g., the AFM signal in the LCH whose frequency is 1.3 MHz) from the level detector 29 after it has been recorded, and also reads and measures the level of the YFM signal from the Y level detector 16. Then, when the reproduced AFM signal reaches a certain level, e.g., the gurgling noise level ODMAX, and also when the YFM signal reaches the maximum value (indicated by R2 in FIG. 8), the levels of the YFM and C' signals are determined as the proper recording current IN (the proper recording current INB for recording the video signal and the proper recording current INA for recording the audio signal), and stored in the memory 36 in a step S203. With the proper recording current IN being thus determined, any gurgling noise is prevented from occurring in the reproduced audio signal, and the signal-to-noise ratio of the reproduced audio signal is kept at a constant value. The signal-to-noise ratio of the reproduced video signal is also kept at a maximum value. The reverse phenomenon is also prevented from taking place. However, since a color beat may possibly occur in the reproduced image depending on the value of the AFM signal, processes described below are carried out in order to avoid such a color beat.

FIG. 11 shows still another processing sequence for the algorithm of determining the proper recording current. A step 301 shown in FIG. 11 effects the same operation as the steps S201 through S203 shown in FIG. 10.

In a step S302, the recording current setting unit 5 controls the selector 7 to connect the input terminal of the signal processor 8 to the capacitor 40 so that no video signal is applied to the signal processor 8, or a blue background video signal that makes the screen of the display monitor 39 blue in its entirety is supplied to the signal processor 8. The blue background signal may be generated by the video signal processor 6 or the on-screen display IC of the display signal generator 38.

Then, the proper recording current INB for the video signal that has been determined in the step S203 in the step S301 is supplied to the video head 1, and the current for the AFM signal is recorded on the video tape 2 by the recording head while being increased at predetermined intervals of time in a step S303.

After the step S303, the recording current setting unit 5 reads and measures the level of the reproduced AFM signal (e.g., the AFM signal in the LCH whose frequency is 1.3 MHz) from the level detector 29 in a step S304.

When the reproduced AFM signal reaches a predetermined level higher than a certain level, e.g., the gurgling noise level ODMAX, and lower than the proper recording current INA determined in the process shown in FIG. 10, the recording current for the AFM signal is determined as the proper recording current INA (see R3 in FIG. 8) for recording the audio signal in a step S305. With the proper recording current INA being thus determined, any gurgling noise is prevented from occurring in the reproduced audio signal, and the signal-to-noise ratio of the reproduced audio signal is kept at a constant value. Furthermore, a color beat is prevented from occurring in the reproduced image due to the level of the AFM signal. The reverse phenomenon is also prevented from taking place, and the signal-to-noise ratio of the reproduced video signal is also kept at a constant value.

Figure 12:
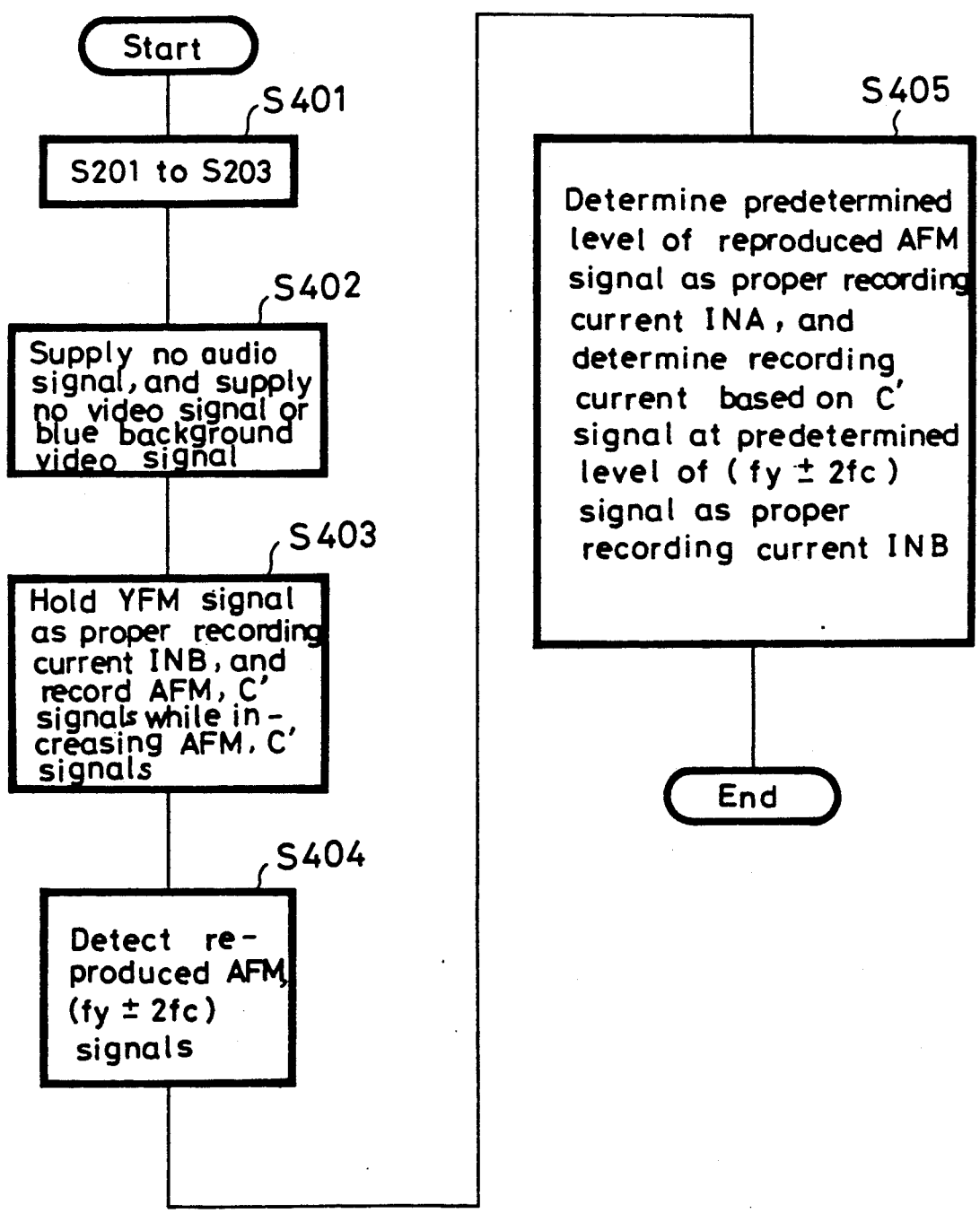

FIG. 12 shows a further processing sequence for the algorithm of determining the proper recording current. A step 401 shown in FIG. 12 effects the same operation as the steps S201 through S203 shown in FIG. 10.

In a step S402, the recording current setting unit 5 controls the selector 21 to apply no audio signal to the signal processor 22, and also no video signal or a blue background video signal is applied to the signal processor 8 as in the step S302 shown in FIG. 11.

Then, in a step S403, the recording current signal S2 for the YFM signal is kept as the proper recording current INB determined in the step S203, and the AFM and C' signals are simultaneously gradually increased at predetermined intervals of time by the electronic volume controls 12, 26, for example, with the level ratio being constant, and recorded on the video tape 2.

The recording current setting unit 5 then detects the level of the reproduced AFM signal with the level detector 29, and also detects the level of a reproduced (fy±2fc) signal, which is a beat signal of the C' signal with respect to the Y signal, with the beat detector 17, in a step S404.

When the reproduced AFM signal reaches a predetermined level, e.g., the level (see R3 in FIG. 8) employed in the process shown in FIG. 11, the recording current for the AFM signal is determined as the proper recording current INA for recording the audio signal in a step S405. Also in the step S405, the recording current according to the C' signal that makes constant the ratio of the level of the reproduced (fy±2fc) signal to the reproduced YFM signal measured in the step S401 (the step S202) is determined as the proper recording current INB. With the proper recording current IN being thus determined, it is possible to reduce any beat that the (fy±2fc) signal may cause to the reproduced image as well as to obtain the same advantages as those of the process shown in FIG. 11.

Setting of the Proper Recording Current IN

In order to achieve any of the proper recording currents IN determined according to the above algorithms, the recording current setting unit 5 reads the data from the memory 36 and controls the electronic volume controls 11, 12, 26 to set the proper recording current IN. The proper recording current IN may be selected either automatically by a default setting or manually by the user through a menu displayed on the screen of the monitor display 39. At this time, a demonstration image and sound based on the proper recording current IN may be reproduced for the user.

After the proper recording current IN has been set, the LED 35 that has been blinking is continuously energized. Furthermore, the recording current setting unit 5 controls the display signal generator 38 to change the display message on the monitor display 39 from "PROPER (OPTIMUM) RECORDING CURRENT IS BEING SET" to "PROPER (OPTIMUM) RECORDING CURRENT HAS BEEN SET." The message may alternatively be displayed on a flat display tube on a liquid crystal display unit (not shown) on the video tape recorder.

The menu displayed on the display monitor 39 may contain a message "PROPER RECORDING CURRENT IS TO BE DETERMINED AND SET/NOT TO BE DETERMINED AND SET IN PRESET PERIOD OF TIME," and the user may select the preliminary recording process, i.e., the process of determining and setting the proper recording current IN using a cursor key (not shown) on a remote control unit (not shown) for the video tape recorder.

The present invention has been described as being incorporated in the video tape recorder in the above embodiment. However, the principles of the present invention may be applied to a printing (magnetic transfer) device for video tapes.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A magnetic recording apparatus comprising:
   a recording and reproducing head receiving recording currents corresponding to audio and video signals for magnetically recording signals corresponding to said recording currents on a magnetic tape and for reproducing recorded signals from said magnetic tape;
   recording current setting means for setting levels of said current supplied to said recording and reproducing head;
   recording signal adjusting means connected to be controlled by said recording current setting for outputting audio and video signals to be recorded and for adjusting levels of said audio and video signals to set the recording currents;
   reproduced signal detecting means for detecting reproduced audio and video signals supplied from said recording signal adjusting means and recorded on and reproduced from the magnetic tape by said recording and reproducing head and supplying the detected signals to said recording current setting means; and
   said recording current setting means comprising means for controlling said recording signal adjusting means to hold the audio signal at a constant level and to simultaneously vary levels of luminance and chrominance signals of the video signal with said levels being kept at a constant ratio, while controlling said recording and reproducing head to magnetically record the audio and video signals on the magnetic tape, and for measuring the level of the reproduced audio signal from said reproduced signal detecting means and controlling said recording signal adjusting means for outputting recording currents based on the levels of the luminance and chrominance signals corresponding to a predetermined value of the measured level of the audio signal.

2. A magnetic recording apparatus according to claim 1, wherein said recording current setting means includes display means for displaying the setting of the recording current while the recording currents are being set.

3. A magnetic recording apparatus according to claim 1, wherein said recording current setting means comprises means for setting the recording currents at constant intervals of time.

4. A magnetic recording apparatus according to claim 1, wherein said recording current setting means comprises means for displaying a failure to set the recording currents when the reproduced signals from said reproduced signal detecting means are lower than a predetermined level.

5. A magnetic recording apparatus comprising:
   a recording and reproducing head receiving recording currents corresponding to audio and video signals for magnetically recording signals corresponding to said recording currents on a magnetic tape and for reproducing recorded signals from the magnetic tape;
   recording current setting means for setting levels of said recording currents supplied to said recording and reproducing head;
   recording signal adjusting means connected to be controlled by said recording current setting for outputting audio and video signals to be recorded and for adjusting levels of said audio and video signals to set the recording currents;
   reproduced signal detecting means for detecting signals reproduced by said recording and reproducing head recorded on the magnetic tape by said recording and reproducing head and supplying the detected signals to said recording current setting means; and
   said recording current setting means comprising means for controlling said recording signal adjusting means to hold the audio signal at a constant level and to simultaneously vary levels of luminance and chrominance signals of the video signal with said levels being kept at a constant ratio, while controlling said recording and reproducing head to magnetically record the audio and video signals on the magnetic tape, and for measuring a level of the audio signal and a level of the luminance signal in the reproduced audio and video signals from said reproduced signal detecting means and supplying said recording and reproducing head with recording currents based on the level of the luminance signal and the level of the chrominance signal corresponding to the level of the luminance signal when the measured level of the audio signal is higher than a first predetermined value and the measured level of the luminance signal is substantially at a second predetermined value.

6. A magnetic recording apparatus according to claim 5, wherein said recording current setting means includes display means for displaying the setting of the recording currents while the recording current is being set.

7. A magnetic recording apparatus according to claim 5, wherein said recording current setting means comprises means for setting the recording currents at constant intervals of time.

8. A magnetic recording apparatus according to claim 5, wherein said recording current setting means comprises means for displaying a failure to set the recording currents when the reproduced signals from said reproduced signal detecting means are lower than a predetermined level.

9. A magnetic recording apparatus according to claim 5, wherein said recording current setting means comprises means for supplying said recording head with a constant recording current set for the video signal, simultaneously supplying the recording head with the recording current for the audio signal to record the audio signal while successively increasing the recording current for the audio signal from a first value at predetermined intervals of time, and for determining the recording current for the audio signal as a proper recording current for the audio signal when the reproduced audio signal is higher than a predetermined level.

* * * * *